United States Patent [19]

Tanaka et al.

[11] Patent Number: 4,699,097
[45] Date of Patent: Oct. 13, 1987

[54] MEANS FOR SUPPRESSING ENGINE OUTPUT TORQUE FLUCTUATIONS

[75] Inventors: Hideki Tanaka, Hiroshima; Takashige Tokushima, Higashi-Hiroshima; Haruki Higashi; Shigeki Hamada, both of Hiroshima, all of Japan

[73] Assignee: Mazda Motor Corporation, Hiroshima, Japan

[21] Appl. No.: 769,892

[22] Filed: Aug. 27, 1985

[30] Foreign Application Priority Data

| Aug. 31, 1984 | [JP] | Japan | 59-183052 |
| Aug. 31, 1984 | [JP] | Japan | 59-183053 |
| Aug. 31, 1984 | [JP] | Japan | 59-183055 |
| Aug. 31, 1984 | [JP] | Japan | 59-183057 |
| Aug. 31, 1984 | [JP] | Japan | 59-183060 |

[51] Int. Cl.[4] .......................................... F02B 75/06
[52] U.S. Cl. ........................... 123/192 R; 123/179 B; 123/179 D; 123/179 M; 290/51
[58] Field of Search .......... 123/1 R, 2, 192 R, 179 A, 123/179 B, 179 D, 179 M; 290/51, 1 C, 34

[56] References Cited

U.S. PATENT DOCUMENTS

| 1,324,793 | 12/1919 | Bucher | 290/34 |
| 1,605,589 | 11/1926 | Hunt | 123/192 R |
| 4,213,428 | 7/1980 | Bradley | 123/1 R |

FOREIGN PATENT DOCUMENTS

| 55-1431 | 1/1980 | Japan | |
| 55-112834 | 9/1980 | Japan | 123/192 R |
| 58-126434 | 7/1983 | Japan | 123/2 |
| 58-185939 | 10/1983 | Japan | 123/192 R |
| 59-37241 | 2/1984 | Japan | 123/2 |
| 1319116 | 6/1973 | United Kingdom | 123/1 R |

Primary Examiner—Andrew M. Dolinar
Attorney, Agent, or Firm—Fleit, Jacobson, Cohn & Price

[57] ABSTRACT

An engine has an output shaft which is connected with a generator and a motor. A control device is provided to operate the generator in a high output torque period and to operate the motor in a low output torque period in an operating cycle of the engine. Thus, the generator applies a negative torque to the output shaft whereas the motor applies a positive torque to the output shaft to thereby moderate the output torque fluctuations.

21 Claims, 15 Drawing Figures

MEANS FOR SUPPRESSING ENGINE OUTPUT TORQUE FLUCTUATIONS

BACKGROUND OF THE INVENTION

1. Field of the Invention

The present invention relates to an internal combustion engine and more particularly to means for suppressing output torque fluctuations in an internal combustion engine.

2. Description of the Prior Art

In internal combustion engines, particularly those of the reciprocating piston type, there are produced cyclical fluctuations in the output torque. Since such output torque fluctuations cause noise and vibrations, it is desirable to suppress them as much as possible. In Japanese patent application No. 53-74100 filed on June 21, 1978 and disclosed for public inspection on Jan. 8, 1980 under the disclosure No. 55-1431, there is disclosed an arrangement which electromagnetically suppress the torque fluctuations. According to the proposal by the Japanese patent application, the means for suppressing the engine output torque fluctuations includes first magnetic flux generating means having permanent magnets mounted on the engine output shaft to rotate therewith, and second magnetic flux generating means having electromagnets mounted on a stationary part of the engine so as to oppose the permanent magnets. The electric current is applied to the electromagnets to energize them so that the engine output shaft is applied with an electromagnetic torque which is of an opposite phase with respect to the torque which is produced as the result of combustion. In this type of arrangement, the electromagnetic torque changes cyclically as the permanent magnet on the output shaft rotates so that electric power is consumed irrespective of whether a positive or negative torque is applied electromagnetically to the output shaft with respect to the direction of rotation of the output shaft. It will therefore be understood that the arrangement proposed by the Japanese patent applications is disadvantageous from the viewpoint of fuel economy.

It should further be pointed out that the prior art described above is designed so that the value of the electromagnetic torque can be changed through control of the electric current applied to the electromagnets, however, it is impossible in this arrangement to control the values of the positive and negative torques independently. Further, the prior art does not suggest anything as to how the torque fluctuation suppressing means shall be controlled to meet requirements under various engine operating conditions such as acceleration, deceleration and high power operation.

SUMMARY OF THE INVENTION

It is therefore an object of the present invention to provide economical means for suppressing the engine output torque fluctuations.

Another object of the present invention is to provide means for suppressing engine output torque fluctuations in which energy can be recovered when a negative torque is applied to the engine output shaft.

A further object of the present invention is to provide means for suppressing engine output torque fluctuations in which a positive torque and a negative torque applied to the engine output shaft can be controlled independently.

Still a further object of the present invention is to provide an engine having means for suppressing output torque fluctuations but possessing satisfactory engine performance in respect of acceleration, deceleration and high power operation.

According to the present invention, the above and other objects can be accomplished, in an internal combustion engine having an output shaft in which cyclical output torque fluctuations, including a high output torque period and a low output torque period, are produced as a result of operation of the engine, by means for suppressing the output torque fluctuations including electric power generating means adapted to be driven by the engine to apply to the output shaft a negative torque directed opposite to the direction of rotation of the output shaft, electric motor means for applying to the output shaft a positive torque which is in the direction of rotation of the output shaft, control means to operate the generating means in the high output torque period and to operate the motor means in the low output torque period. The generating means may comprise magnet means mounted on one of a rotatable member and a stationary part of the engine which is adjacent to the rotatable member and first coil means mounted on the other. Similarly, the motor means may comprise magnet means mounted on one of a rotatable member and a stationary part of the engine which is adjacent to the rotatable member and second coil means mounted on the other. Of course, the magnet means may be used in common for the generating and motor means. The operations of the first and second coil means are appropriately controlled to operate the generating and motor means. For the purpose of obtaining high power performance of the engine, the control means may be made inoperative under a high speed range. The positive torque and the negative torque may be controlled in value, depending on the engine operating conditions such as acceleration and deceleration, so that desired engine performance can be obtained.

The above and other objects and features of the present invention will become apparent from the following descriptions of preferred embodiments taking reference to the accompanying drawings.

DESCRIPTION OF THE PREFERRED EMBODIMENTS

Figure 1:
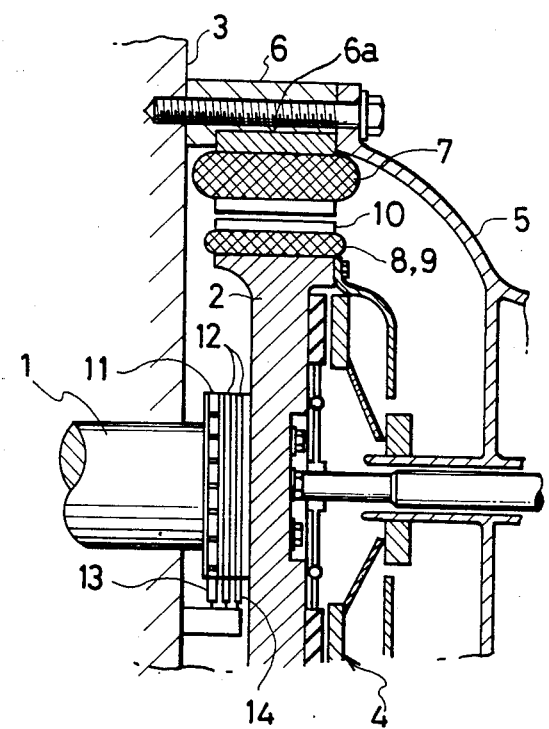
FIG. 1 is a fragmentary side sectional view of a device in accordance with one embodiment of the present invention.
Figure 2:
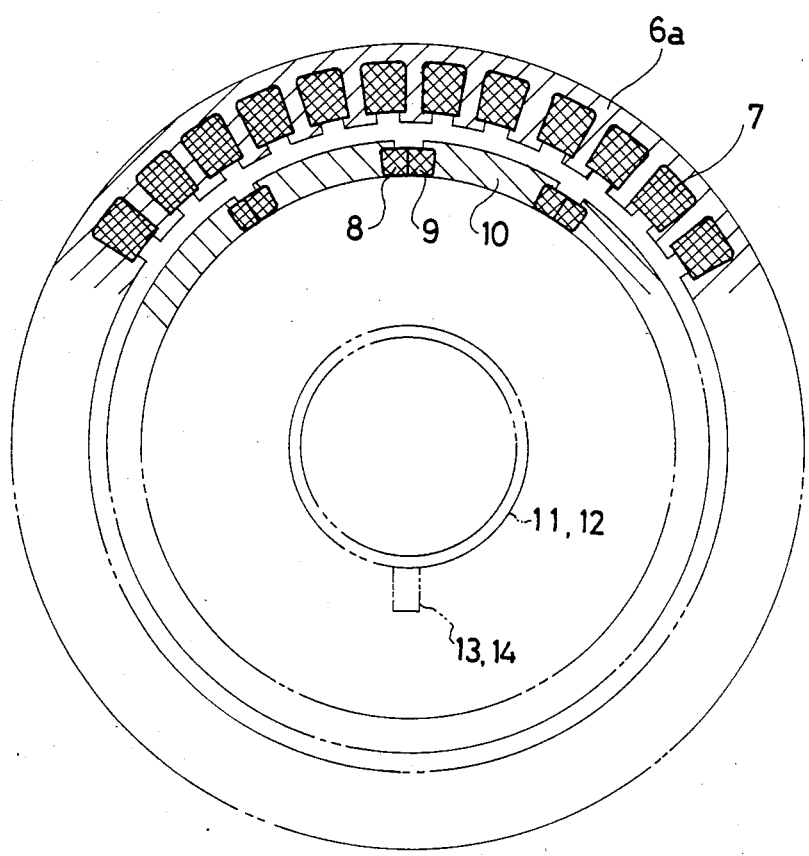
FIG. 2 is a front view of the device shown in FIG. 1.
Figure 3:
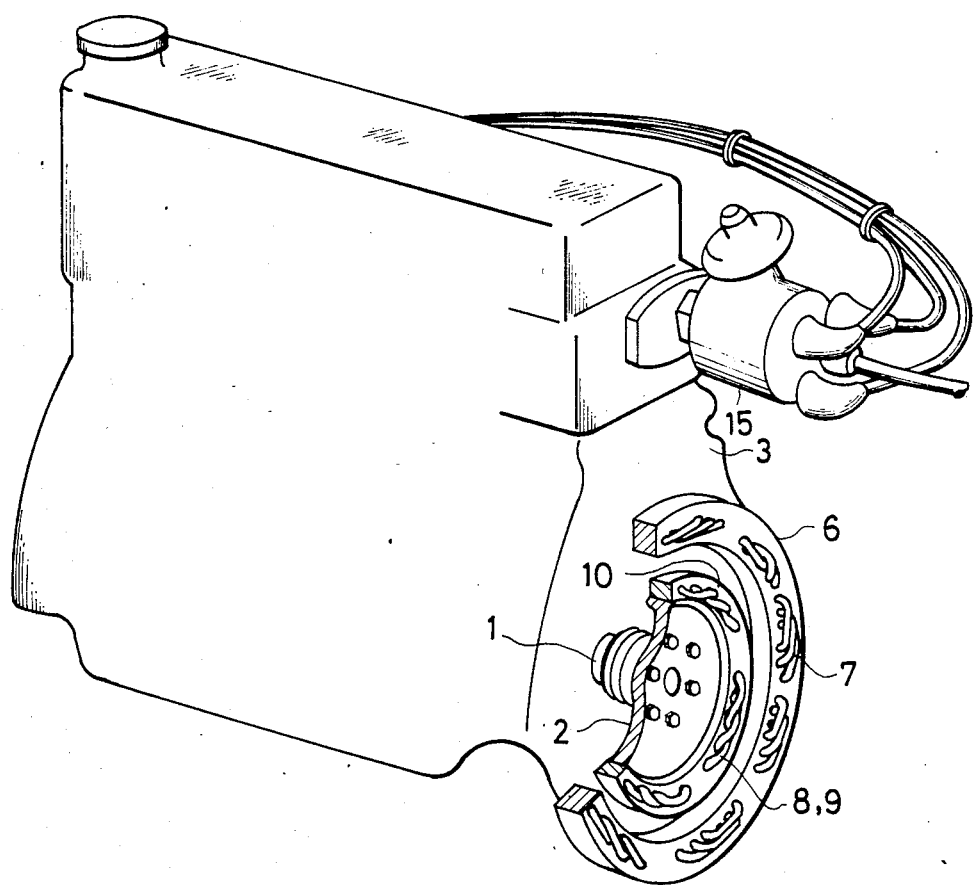
FIG. 3 is a perspective view of an engine having the device shown in FIGS. 1 and 2.

Referring to the drawings, particularly to FIGS. 1 through 3, there is shown an engine having an output shaft 1 extending outward from a cylinder block 3 and carrying a flywheel 2 attached to the outer end thereof. A clutch mechanism 4 is connected with the flywheel 2 and covered by a clutch housing 5 which is mounted on the cylinder block 3 through a cylindrical mounting member 6. The mounting member 6 carries a coil support 6a on its inner surface and a stationary electromagnetic coil 7 is carried by the coil support 6a. On the outer peripheral surface of the flywheel 2, there are mounted rotatable electromagnetic coils 8 and 9 and a body 10 of a magnetic material. On the axially inner side of the flywheel 2, the engine output shaft 1 is provided with a commutator 11 and a pair of slip rings 12. A brush 13 is provided to contact the commutator 11 and brushes 14 are provided to contact the respective ones of the slip rings 12. The reference numeral 15 designates a distributor for the ignition system.

Figure 4:
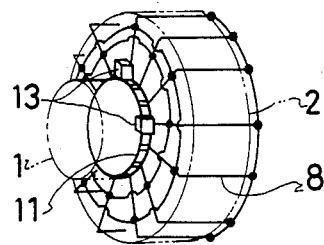
FIG. 4 is a perspective view showing the coil arrangements of the motor in the embodiment.
Figure 5:
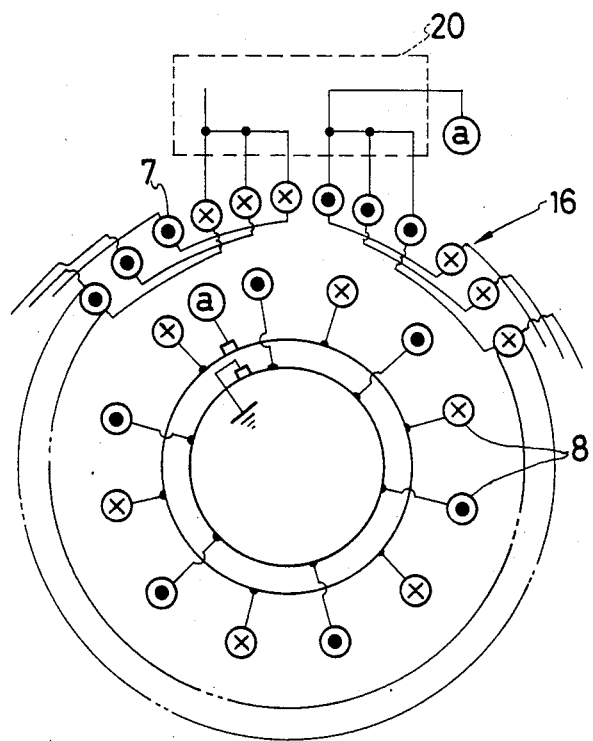
FIG. 5 is a diagrammatical illustration of the coil arrangements of the motor.
Figure 6:
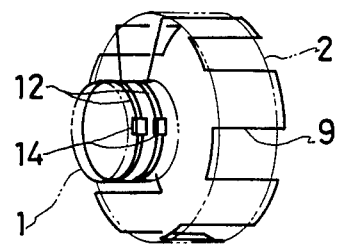
FIG. 6 is a perspective view showing the coil arrangements of the generator.
Figure 7:
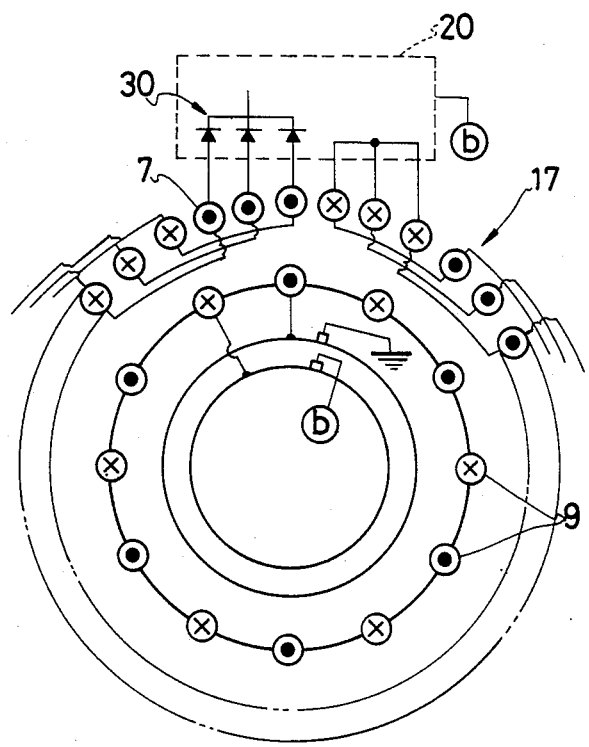
FIG. 7 is a diagrammatical illustration of the coil arrangements in FIG. 6.

Referring to FIGS. 5 and 7, it will be understood that the stationary coil 7 is of a three phase connection and arranged in wave windings. The stationary coil 7 functions as a coil both for an electric power generator and an electric motor. The rotatable coil 8 functions as an armature coil for the motor and is connected with the commutator 11 as shown in FIG. 4 in a manner well known in the art. The rotatable coil 9 is arranged in wave windings as shown in FIG. 6 and connected with the slip rings 12. For controlling the current to the coils 7, 8 and 9, there is provided a control unit 20.

Figure 8:
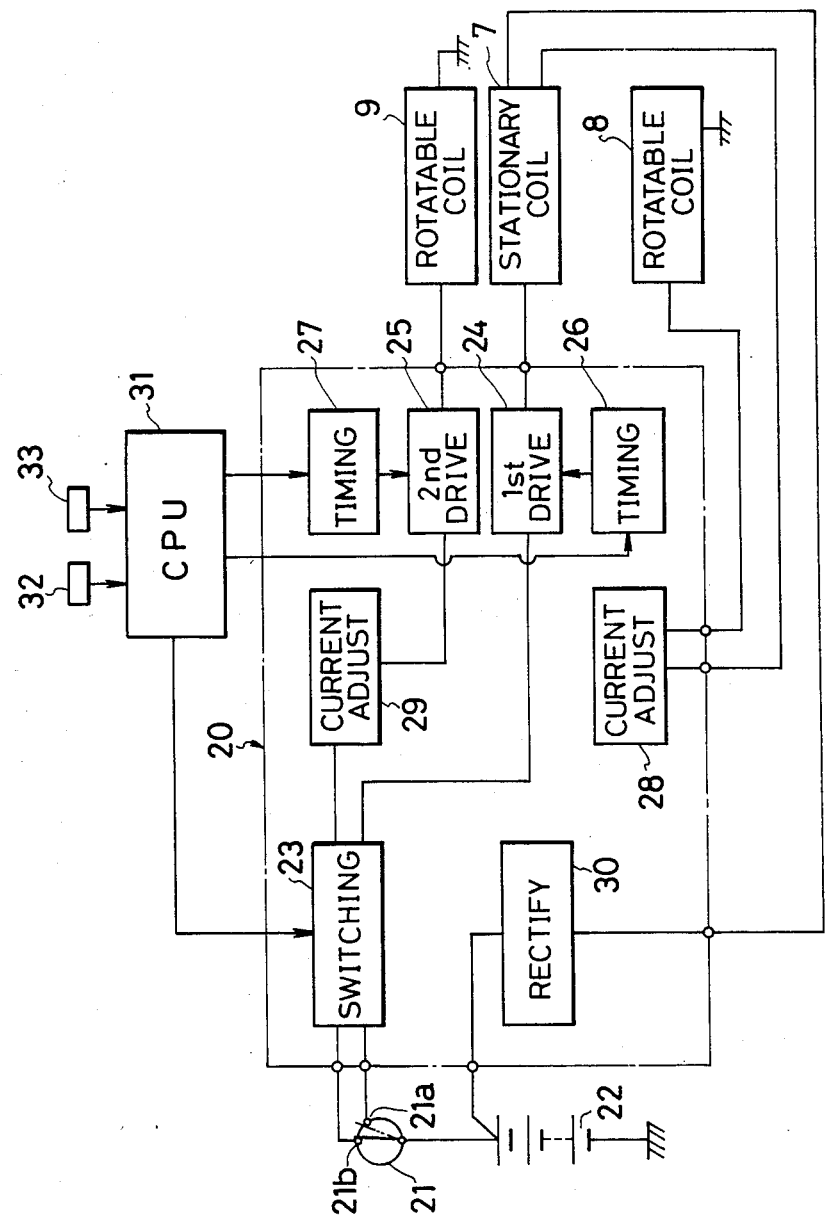
FIG. 8 is a block diagram showing an example of the control unit.

Referring to FIG. 8, there is shown that the control unit 20 is connected through a main switch 21 with a battery 22. The main switch 21 has a starter contact 21a and an ignition contact 21b which are connected with a switching circuit 23 in the control unit 20. The control unit 20 further includes a first driving circuit 24 connected with the switching circuit 23 and a second driving circuit 25 connected through a current adjusting circuit 29 with the switching circuit 23. For controlling the operation of the driving circuits 24 and 25, there are provided timing circuits 26 and 27 which have outputs respectively connected with the driving circuits 24 and 25. The timing circuits 26 and 27 are cotrolled by a central processing unit 31 which receives signals from an engine crank angle sensor 32 and an engine intake pressure sensor 33. The control unit 20 further includes a current adjusting circuit 28 and a rectifying circuit 30.

The first driving circuit 24 functions when energized to connect the stationary coil 7 through the current adjusting circuit 28 with the rotatable coil 8 so as to complete the motor circuit 16 shown in FIG. 5. When the first driving circuit 24 is de-energized, the stationary coil 7 is connected through the rectifying circuit 30 with the battery to complete a charging circuit.

The second driving circuit 25 is connected with the rotatable coil 9 so that, when the circuit 25 is energized, the coil 9 is supplied with electric current to make the generating circuit 17 shown in FIG. 7 operate. The first and second driving circuits 24 and 25 are alternately energized so that the first driving circuit 24 is de-energized when the second driving circuit 25 is energized. It will therefore be understood that, when the second driving circuit 25 is energized, the rotatable coil 9 is energized to generate electric current as shown by symbols in FIG. 7 and the current is charged to the battery 22.

The switching circuit 23 functions to make the first driving circuit 24 operate continuously when the starter contact 21a of the main switch 21 is closed so that the motor circuit 16 is completed. Thus, the motor comprised of the circuit 16 can be continuously used as the starter motor during engine starts. After the engine start, the switching circuit 23 functions to connect the first and second driving circuits 24 and 25 with the battery so that the driving circuits 24 and 25 are alternately energized in accordance with the outputs of the timing circuits 26 and 27. Thus, the driving circuits 24 and 25 are energized at appropriate times by the CPU 31 through the timing circuits 26 and 27.

Figure 9:
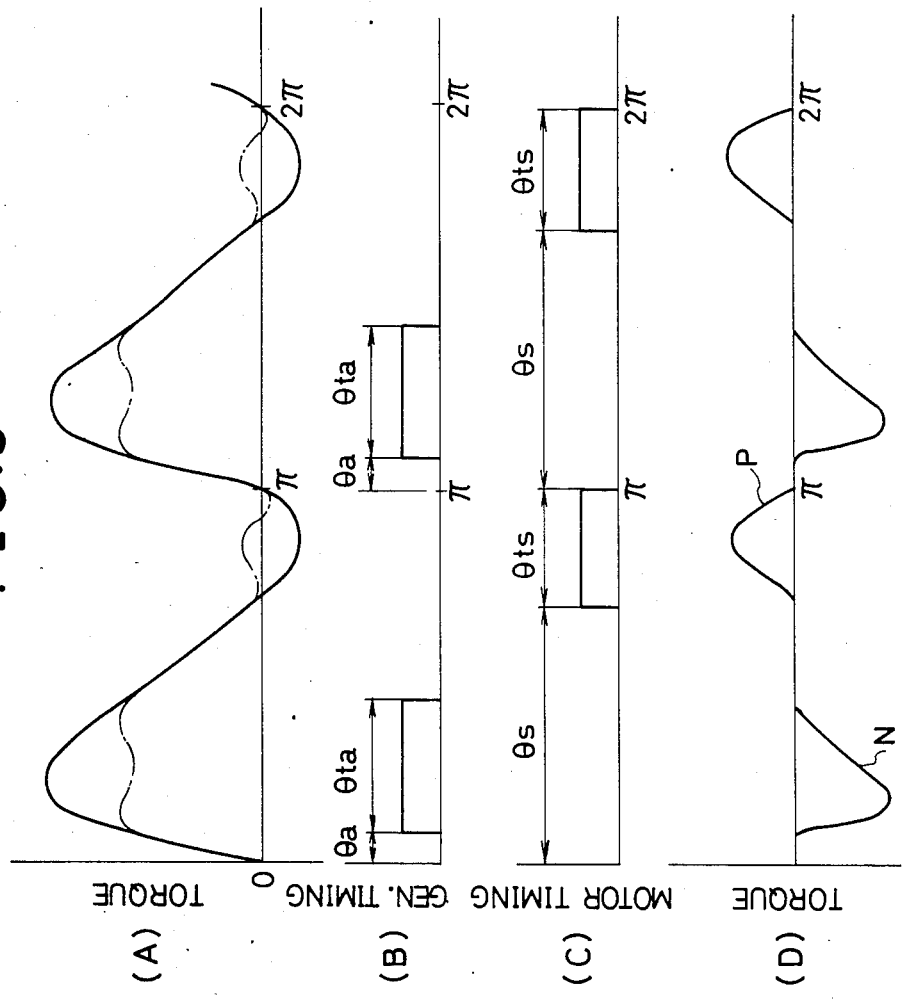
FIG. 9 is a diagram showing the relationship between the engine output torque fluctuations, the operations of the generator and the motor and the positive and negative torques produced by the motor and the generator.

It will thus be understood that the CPU 31 and the timing circuits 26 and 27 constitute control means for controlling the operations of the motor circuit 16 and the generator circuit 17 in such a manner that the engine output torque fluctuations are suppressed. FIG. 9(A) shows an example of the output torque fluctuation which appears in the output shaft of a four cylinder, four stroke engine. As shown, the output torque varies with a cycle of 180°. Therefore, the generator circuit 17 is completed at a timing $\theta_a$ for a period of $\theta_{ta}$ as shown in FIG. 9(B) so that the generator is operated in a period wherein the engine output torque is high. The motor circuit 16 is completed at a timing $\theta_s$ for a period $\theta_{ts}$ as shown in FIG. 9(C) so that the motor is operated in a period wherein the engine output torque is low. The CPU 31 performs calculations based on the engine crank angle signal from the sensor 32 to apply the outputs to the driving circuits 26 and 27 at appropriate timings. The generator produced a negative torque N whereas the motor produces a positive torque P so that the output torque fluctuation becomes moderate as shown by broken lines in FIG. 9(A).

The timings $\theta_a$ and $\theta_s$ and the operating periods $\theta_{ta}$ and $\theta_{ts}$ may be of fixed values. However, it is preferable to change these values in accordance with engine operating conditions. For example, during acceleration, the operating period for the generator may be decreased to thereby decrease the negative output torque and obtain a high acceleration rate. In deceleration, the operating period for the generator may be increased to thereby increase the negative torque. For high power operation, the operating period for the generator may be decreased and that for the motor may be increased so that the negative torque is decreased and the positive torque is increased.

Figure 10:
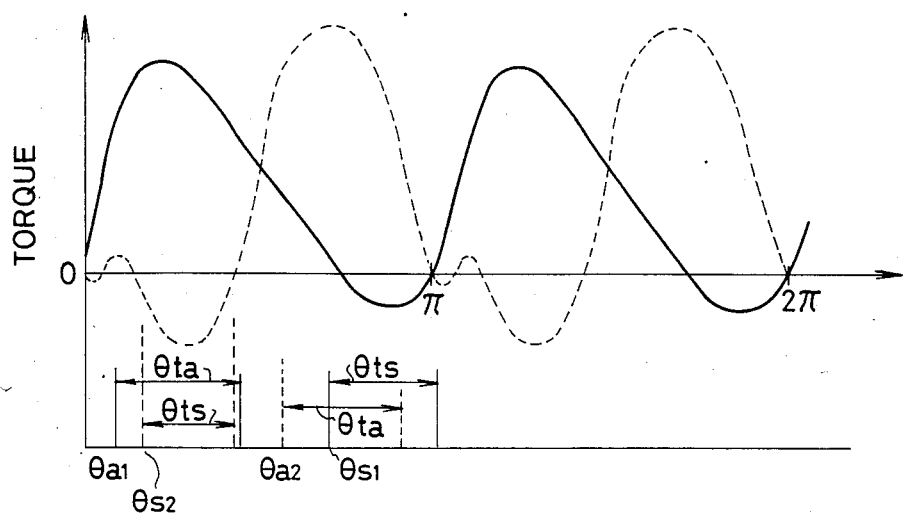
FIG. 10 shows torque fluctuations in low speed and high speed regions.
Figure 11:
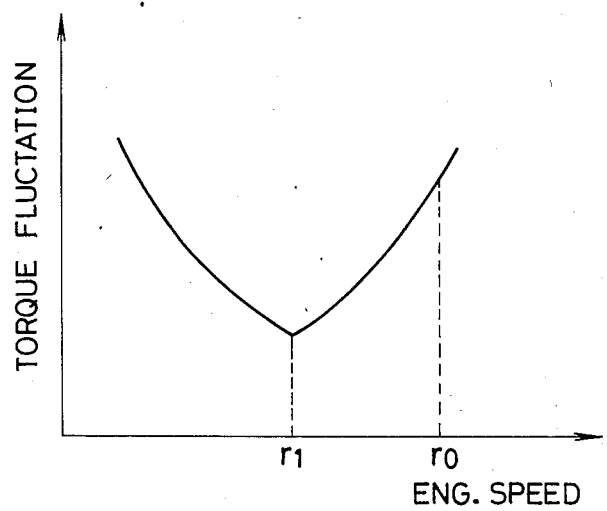
FIG. 11 is diagram showing the relationship between the engine output torque fluctuations and the engine speed.

In case of a reciprocating piston engine, a cyclically changing output torque is produced as shown in FIG. 9(A) or by a solid line in FIG. 10 as a result of combustion in the engine, and further cyclically changing torque is produced as shown by dotted lines in FIG. 10 under the influence of inertia of the moving parts in the engine. It will be noted that the torque under inertia is 90° offset in phase from the torque under combustion. Further, the torque under interia increases in response to an increase in the engine speed. As as result, the fluctuation of the overall torque in the output shaft decreases as the engine speed increases with the engine speed below a certain value $r_1$ and starts to increase as the engine speed increases beyond the value $r_1$ as shown in FIG. 11. It will be noted that, in the speed range beyond the value $r_1$, torque fluctuation due to the inertia is greater than that due to combustion so that there will be a 90° phase change in the overall torque fluctuation in the output shaft between the speed ranges above and below the value $r_1$. It is therefore preferable to change the operating timings for the motor circuit 16 and the generator circuit 17. Further, the aforementioned torque fluctuation control may be carried out under an engine speed range below a certain value $r_o$ because it will not be necessary to suppress the torque fluctuations in a very high speed range.

Figure 12:
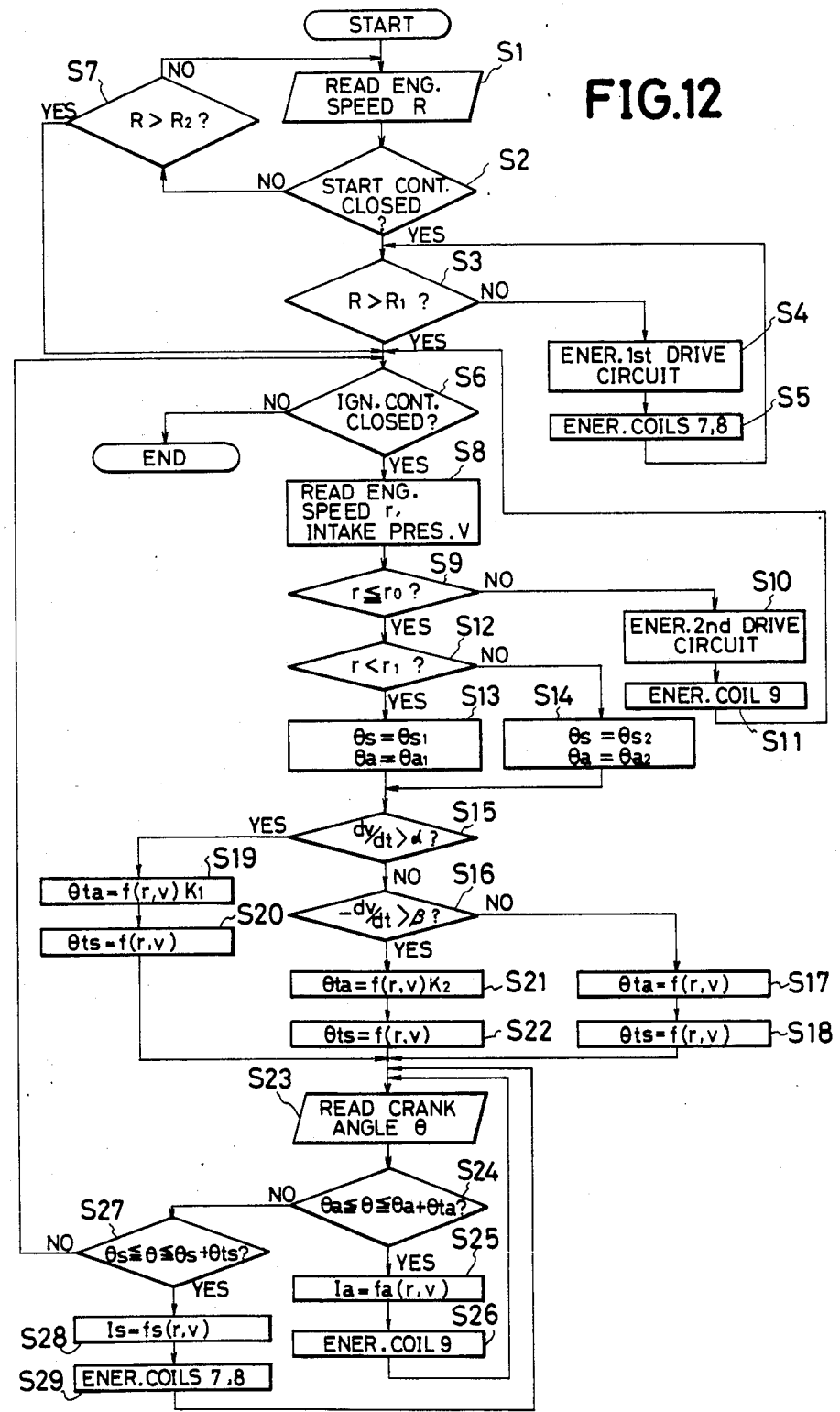
FIG. 12 is a flow chart showing the operation of the control unit.

The operation of the CPU 31 and its associated circuits will now be described with reference to the flow chart shown in FIG. 12. After start, the engine speed R is at first read in step $S_1$ and then a judgement is made in step $S_2$ as to whether the start contact 21a of the main switch 21 is closed. When it is judged that the start contact 21a is closed, the CPU 31 applies an output to the switching circuit 23 so that it functions to operate the first driving circuit 24 to complete the motor circuit 16. Thus, the engine is driven by the motor comprised of the motor circuit 16. This operation is continued until the engine speed R exceeds a predetermined value $R_1$. For that purpose, a judgement is made in step $S_3$ as to whether the engine speed R is greater than the value $R_1$. If the result of the judgement is NO, a step $S_4$ is carried out to make the switching circuit 23 function to operate the first driving circuit 24 continuously. Thus, the stationary coil 7 and the rotatable coil 8 are energized in step $S_5$. When the engine speed R is greater than the value $R_1$, a step $S_6$ is carried out. When the result of the judgement in step $S_2$ shows that the start contact 21a is not closed, a judgement is made in step $S_7$ as to whether the engine speed R is greater than the value $R_1$ and, when the engine speed R is greater than the value $R_1$, the operation proceeds to step $S_6$ but, when the engine speed R is smaller than the value $R_1$, the procedure returns to the step $S_1$. The above steps are for the engine starting procedure.

In the step $S_6$, a judgement is made as to whether the ignition contact 21b of the main switch 21 is closed and if the answer is NO, the procedure comes to the end. If the answer in the judgement of the step $S_6$ is YES, the engine speed r and the intake air pressure v are read in step $S_8$ and a judgement is made in step $S_9$ as to whether the engine speed r is not larger than the upper limit value $r_o$ as shown in FIG. 11. If the engine speed r is larger than the limit value $r_o$, the first driving circuit 26 is de-energized and the second driving circuit 27 is energized in step $S_{10}$ and the generator coil 9 is energized in step $S_{11}$. Thus, only the generator circuit 17 is operated in the high speed range. Then, the procedure returns to the step $S_6$.

If the engine speed r is smaller than the value $r_o$, a step $S_{12}$ is carried out to judge whether the engine speed r is lower than the value $r_1$ shown in FIG. 11. If the engine speed r is lower than the value $r_1$, a step $S_{13}$ is carried out to determine the motor start timing $\theta_s$ and the generator start timing $\theta_a$ respectively to values $\theta_{s1}$ and $\theta_{a1}$ which correspond to the torque fluctuations in the low speed range as shown in FIG. 10. If the engine speed r is higher than the value $r_1$, a step $S_{14}$ is carried out to determine the motor start timing $\theta_s$ and the generator start timing $\theta_a$ to values $\theta_{s2}$ and $\theta_{a2}$ which correspond to the torque fluctuations as shown in FIG. 10 in the speed range between the values $r_1$ and $r_2$. Then, the procedures goes to a step $S_{15}$ wherein a judgement is made as to whether the rate of change of the intake air pressure dv/dt is greater than a predetermined value $\alpha$. The step $S_{15}$ is carried out to detect engine acceleration because the intake air pressure increases for acceleration. If it is found that the engine is not under acceleration, a step $S_{16}$ is carried out to detect whether the engine is under deceleration. For that purpose, the rate of decrease of the intake air pressure - dv/dt is compared with a constant value $\beta$ and, if it is found that the engine is not under deceleration, the generator operating period $\theta_{ta}$ is determined in step $S_{17}$ as a function of the engine speed r and the engine intake air pressure. Thereafter, the motor operating period $\theta_{ts}$ is determined in step $S_{18}$ as a function of the engine speed r and the engine intake air pressure v.

When the judgement in the step $S_{15}$ is that the engine is under acceleration, the generator operating period $\theta_{ta}$ is calculated by multiplying the function in the step $S_{17}$ with a constant $K_1$ which is smaller than 1. Then, a step $S_{20}$ is carried out to calculate the motor operating period $\theta_{ts}$ as in the step $S_{18}$. When the judgement in the step $S_{16}$ is that the engine is in deceleration, the generator operating period is calculated in step $S_{21}$ by multiplying the function in the step $S_{17}$ with a constant $K_2$ which is greater than 1. Thereafter, the motor operating period $\theta_{ts}$ is calculated in step $S_{22}$ as in the step $S_{18}$.

After either of the steps $S_{18}$, $S_{20}$ and $S_{22}$, the crank angle signal $\theta$ is read in step $S_{23}$ and a judgement is made in step $S_{24}$ as to whether the crank angle $\theta$ is between $\theta_a$ and $\theta_a + \theta_{ta}$. If the answer is YES, a calculation is made in step $S_{25}$ based on a function of the engine speed r and the engine intake air pressure v to obtain a current value Ia. Then, the second driving circuit 27 is energized in step $S_{26}$ to supply the current Ia to the coil 9. If the crank angle $\theta$ is not between $\theta_a$ and $\theta_a + \theta_{ta}$, a further judgement is made in step $S_{27}$ as to whether the crank angle $\theta$ is between $\theta_s$ and $\theta_s + \theta_{ts}$. If the answer is NO, the procedure returns to the step $S_6$ but if the answer is YES, a calculation is made in step $S_{28}$ based on the engine speed r and the engine intake air pressure v to obtain a current value Is. Then, the first driving circuit 26 is energized in step $S_{29}$ and the coils 7 and 8 are supplied with the current Is. After the steps $S_{26}$ and $S_{29}$, the procedure is repeated from the step $S_{23}$.

It will be understood from the above description that under an engine speed lower than the value $r_o$ after the engine starts, the generator circuit 17 and the motor circuit 16 are alternately operated at timings as shown in FIGS. 9(B) and (C) when the engine speed r is lower than the value $r_1$ in FIG. 11. Thus, the negative torque N and the positive torque P are produced as shown in FIG. 9(D) to thereby moderate the torque fluctuations, as shown by broken lines in FIG. 9(A). When the negative torque N is being produced, the generator circuit 17 generates electric power which is charged to the battery 22. It is therefore possible to recover the energy which may otherwise be lost by the negative torque. The functions in the steps $S_{17}$, $S_{18}$, $S_{25}$ and $S_{28}$ may be determined appropriately to obtain desired results. For high power operation, it is possible to decrease the generator operating period $\theta_{ta}$ by multiplying the value obtained in the step $S_{17}$ with a constant smaller than 1 and increase the motor operating period $\theta_{ts}$ by multiplying the value as obtained in the step $S_{18}$ with a constant greater than 1.

Figure 13:
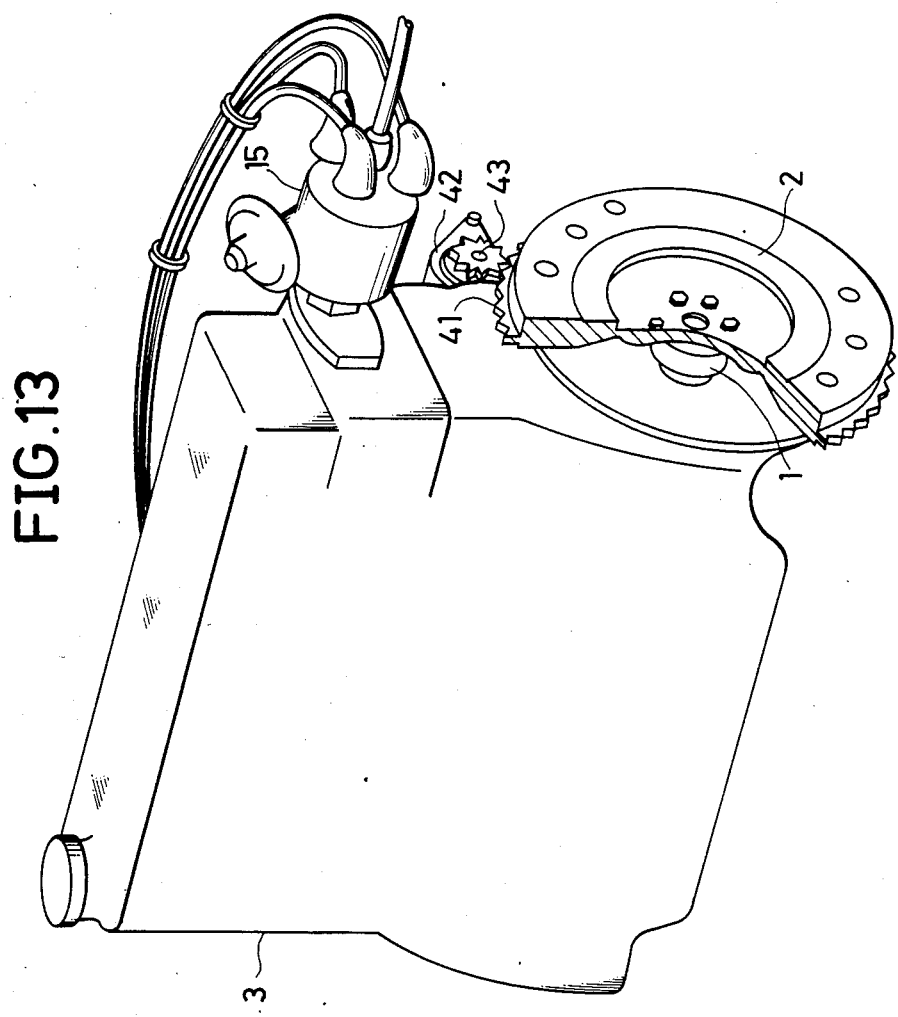
FIGS. 13 through 15 show other embodiments of the present invention.
Figure 14:
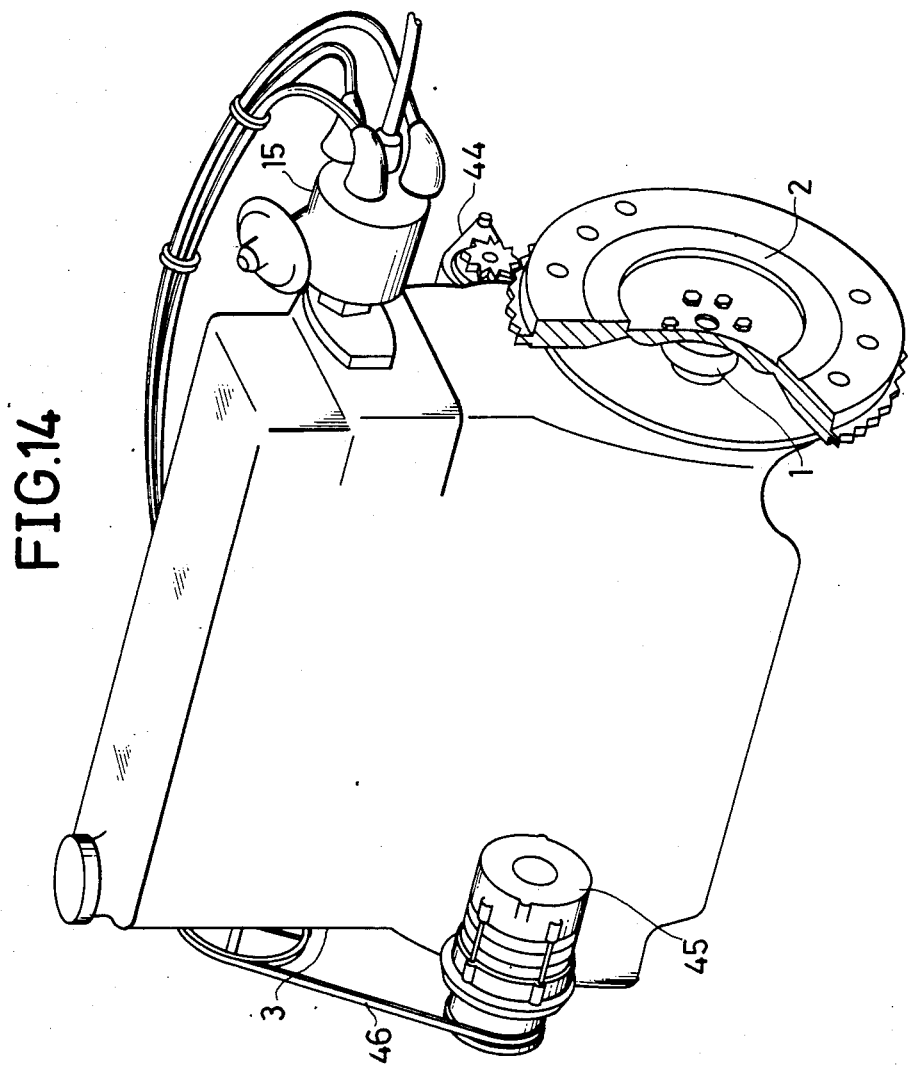
Figure 15:
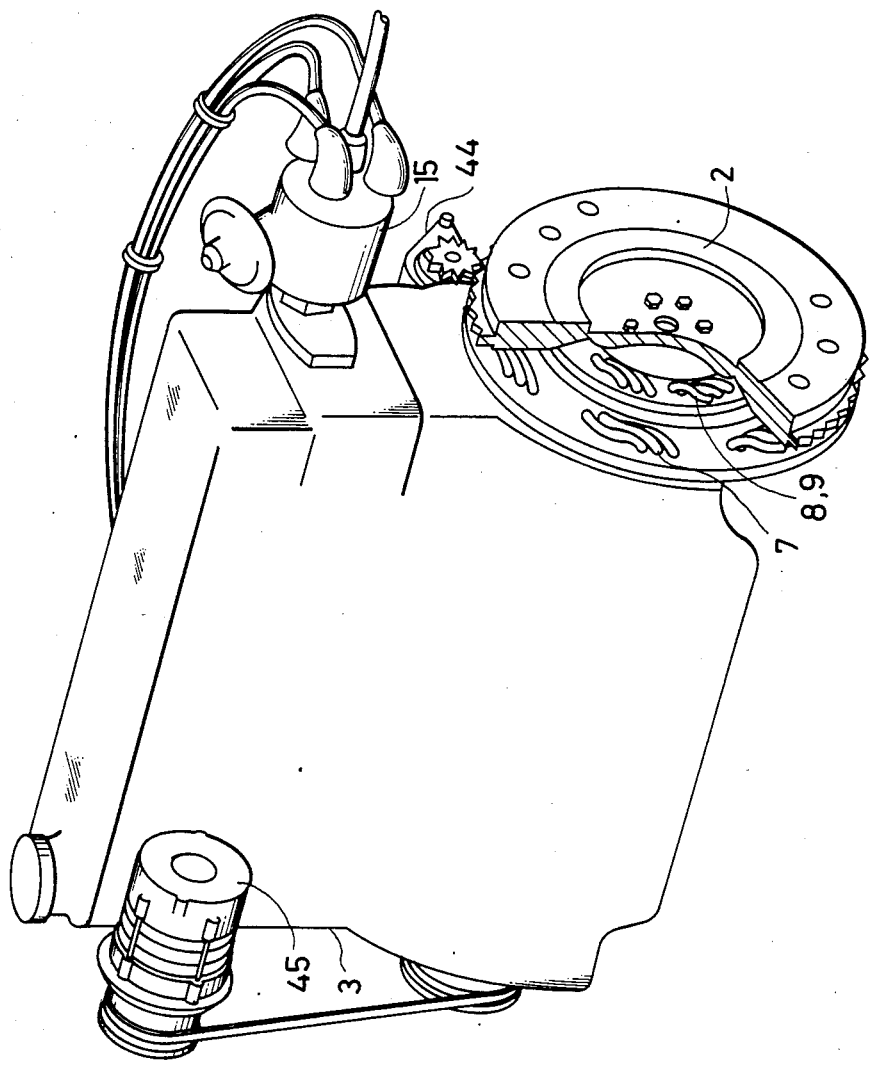

FIG. 13 shows another embodiment of the present invention in which a starter-generator 42 is mounted on the cylinder block 3 and a pinion 43 is mounted on the shaft of the starter-generator 42. The flywheel 2 is provided at the outer periphery with gear teeth 41 which are engaged with the pinion 43. In FIG. 14, a starter 44 is arranged so as drive the flywheel 2 and an alternator 45 is mounted on the engine block 3 so as to be driven by the engine through an endless belt 46. The starter 44 and the alternator 45 may be controlled as described above. In FIG. 15, the previously described coils 7, 8 and 9 are provided in addition to the starter 44 and the alternator 45.

The invention has thus been shown and described with reference to specific embodiment. However, it should be noted that the invention is in no way limited to the details of the illustrated embodiments, and changes and modifications may be made without departing from the scope of the appended claims.

We claim:

1. In an internal combustion engine having an output shaft in which cyclical output torque fluctuations including a high output torque period and a low output torque period are produced as a result of operation of the engine, means for suppressing the output torque fluctuations including electric power generating means adapted to be driven by the engine to supply the output shaft with a negative torque directed opposite to a direction of rotation of the output shaft, electric motor means for applying to the output shaft a positive torque which is in the direction of rotation of the output shaft, engine operating condition detecting means for producing an engine condition signal representing an engine operating condition, control means to operate the generating means in the high output torque period and to operate the motor means in the low output torque period, engine output shaft phase detecting means for producing an output shaft phase signal representing the rotational phase of the engine output shaft, engine speed detecting means for producing an engine speed signal, said control means including means for controlling operating timings of the power generating means and the motor means in accordance with said phase signal and said engine speed signal, and timing control means for receiving a signal from said control means and producing first and second motor starting timings and first and second generator starting timings, the operating timings of each of the generating means and the motor means being switched as an engine speed above changes to an engine speed below an engine speed at which torque fluctuations by combustion in the engine is substantially equal to those by inertia of the engine moving parts and vice versa.

2. Means in accordance with claim 1 in which said control means includes acceleration detecting means and means for decreasing the negative torque produced by the generating means with respect to the positive torque produced by the motor means when an engine acceleration is detected.

3. Means in accordance with claim 2 in which said control means includes acceleration detecting means and means for decreasing the negative torque produced by the generating means to a level lower than that for normal engine operation when engine acceleration is detected.

4. Means in accordance with claim 1 in which said control means includes deceleration detecting means and means for increasing the negative torque produced by the generating means with respect to the positive torque produced by the motor means when an engine deceleration is detected.

5. Means in accordance with claim 4 in which said control means includes deceleration detecting means and means for increasing the negative torque produced by the generating means when engine deceleration is detected.

6. Means in accordance with claim 1 in which said control means includes means for detecting engine load and increasing the positive torque produced by said motor means under a heavy load engine operation.

7. Means in accordance with claim 6 in which said control means includes means for detecting engine load and increasing the positive torque produced by said motor means while decreasing a negative torque produced by said generating means under a heavy load engine operation.

8. Means in accordance with claim 6 in which said control means includes means for gradually increasing the positive torque with respect to the negative torque in response to an increase in engine load.

9. Means in accordance with claim 1 in which said generating means and said motor means include electromagnetic means so that operation of the generating means and the motor means is controlled by controlling current supply to the electromagnetic means, said control means including means for changing the time period wherein current is supplied to said electromagnetic means in accordance with engine operating conditions to change the torque applied to the engine output shaft.

10. In an internal combustion engine having an output shaft in which cyclical output torque fluctuations including a high output torque period and a low output torque period are produced as a result of operation of the engine, torque fluctuation suppressing means including fixed coil means provided on a stationary part of the engine for defining stator coil means of an AC generator means and for defining stator magnetic body means of a motor means, first rotating coil means provided on a rotating part of the engine and connected in parallel with said stator magnetic body means to provide electromagnet means which defined armature means of the motor means, second rotating coil means provided on a rotating part of the engine in a waved configuration to define a field coil means of said AC generator means, control means for providing a current supply to said fixed coil means and first rotating coil means to operate the motor means so that a positive torque is applied to said output shaft and to said second rotating coil means and for connecting the fixed coil means to rectifying means to operate said generator means to thereby apply a negative torque to said output shaft, said control means including first timing control means for controlling timing of the current supply to said fixed coil means so that said motor means is operated in the low output torque period, and second timing control means for controlling timing of current supply to said second rotating coil means so that said AC generator means is operated in the high output torque period.

11. Means in accordance with claim 10 which includes means for operating said control means under an engine speed lower than a predetermined value.

12. Means in accordance with claim 10 in which said rotating part is a flywheel secured to the output shaft and said stationary part is a casing covering the flywheel.

13. Means in accordance with claim 10 in which said control means includes means for operating said motor means during engine start to use said motor means as a starter motor.

14. Means in accordance with claim 10 in which said control means includes means for operating said generating means continuously under an engine speed higher than a predetermined value.

15. Means in accordance with claim 10 in which said control means includes means for increasing said positive torque with respect to said negative torque under a heavy load condition as compared with a light load condition.

16. Means in accordance with claim 10 which includes means for operating said control means under an engine speed lower than a predetermined value.

17. Means in accordance with claim 10 in which said control means includes means for detecting engine load and increasing the positive torque produced by said motor means while decreasing the negative torque produced by said generator means under a heavy load engine operation.

18. Means in accordance with claim 10 in which said torque fluctuation suppressing means includes phase detecting means for detecting a phase of the output shaft and engine speed detecting means, said control means being means for reversing operating timings of the generator means and the motor means between engine speed ranges above and below a predetermined engine speed.

19. Means in accordance with claim 10 in which said control means includes acceleration detecting means and means for decreasing the negative torque produced by the generator means with respect to the positive torque produced by the motor means when an engine acceleration is detected.

20. Means in accordance with claim 10 in which said control means includes deceleration detecting means and means for increasing the negative torque produced by the generator means with respect to the positive torque produced by the motor means when an engine deceleration is detected.

21. Means in accordance with claim 10 in which said generating means and said motor means include electromagnetic means so that operation of the generator means and the motor means is controlled by controlling current supply to the electromagnetic means, said control means including means for changing the time period wherein current is supplied to said electromagnetic means to change the torque applied to the engine output shaft.

* * * * *